US012761108B2

(12) United States Patent
Fukui et al.

(10) Patent No.: US 12,761,108 B2
(45) Date of Patent: Oct. 13, 2026

(54) LEAK DIAGNOSIS APPARATUS

(71) Applicant: TOYOTA JIDOSHA KABUSHIKI KAISHA, Toyota (JP)

(72) Inventors: Keita Fukui, Fujinomiya (JP); Yuusaku Nishimura, Toyota (JP); Hideki Miyahara, Miyoshi (JP); Yoshiyuki Hatano, Susono (JP); Takayuki Yamada, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 327 days.

(21) Appl. No.: 18/606,841

(22) Filed: Mar. 15, 2024

(65) Prior Publication Data

US 2024/0310236 A1 Sep. 19, 2024

(30) Foreign Application Priority Data

Mar. 17, 2023 (JP) ................................ 2023-043445

(51) Int. Cl.
*G01M 3/32* (2006.01)

(52) U.S. Cl.
CPC .................................... *G01M 3/32* (2013.01)

(58) Field of Classification Search
CPC .. G01M 3/002; G01M 3/3272; G01M 3/3263; G01M 3/025; F02D 41/0045; F02M 25/0827
See application file for complete search history.

(56) References Cited

U.S. PATENT DOCUMENTS 6,789,523 B2 * 9/2004 Oki .................... F02M 25/0827 123/520
6,834,227 B2 * 12/2004 Saito .................. F02M 25/0809 73/114.39
6,892,712 B2 * 5/2005 Miwa ................ F02M 25/0809 123/198 D
6,935,163 B2 * 8/2005 Stewart ................... G01M 3/26 73/49.7
6,950,742 B2 * 9/2005 Yamaguchi ........... G01M 3/025 73/114.38
7,080,548 B2 * 7/2006 Nakoji ............... F02M 25/0818 73/114.38
7,140,241 B2 * 11/2006 Wakahara .......... F02M 25/0809 73/114.38
7,165,446 B2 * 1/2007 Miyahara ............... F02M 25/08 73/40
7,168,303 B2 * 1/2007 Takahashi ........... G01M 3/3236 73/114.38
7,290,535 B2 * 11/2007 Kimura ............. F02M 25/0818 73/40

(Continued)

FOREIGN PATENT DOCUMENTS

JP 2012-112306 A 6/2012
JP 2013-137035 A 7/2013

*Primary Examiner* — Tran M. Tran
(74) *Attorney, Agent, or Firm* — Finnegan, Henderson, Farabow, Garrett and Dunner, LLP

(57) ABSTRACT

A leak diagnosis apparatus for performing leak diagnosis of a fuel tank mounted on a vehicle, includes a calculation unit configured to calculate an amount of change in a pressure in the fuel tank and an amount of change in a temperature of a fuel in the fuel tank while an ignition is turned off, and a determination unit configured to determine whether a leak in the fuel tank is absent or present.

3 Claims, 7 Drawing Sheets

1

(56) References Cited

U.S. PATENT DOCUMENTS

| | | | | |
|---|---|---|---|---|
| 7,366,604 | B2 * | 4/2008 | Ishii | F02M 25/0827<br>123/520 |
| 7,379,810 | B2 * | 5/2008 | Soga | F02D 41/2467<br>123/480 |
| 7,448,257 | B2 * | 11/2008 | Kimura | F02M 25/0818<br>73/49.7 |
| 7,484,406 | B2 * | 2/2009 | Miyahara | F02M 25/0809<br>73/49.7 |
| RE41,660 | E * | 9/2010 | Morinaga | F02M 25/0809<br>73/114.39 |
| RE41,823 | E * | 10/2010 | Miwa | F02M 25/0809<br>123/198 D |
| 8,104,333 | B2 * | 1/2012 | Takakura | F02M 25/0809<br>73/114.39 |
| 9,031,721 | B2 * | 5/2015 | Fukui | B60W 10/06<br>701/22 |
| 9,464,960 | B2 * | 10/2016 | Nishimura | G01M 3/3245 |
| 11,674,477 | B2 * | 6/2023 | Ishihara | F02M 25/0818<br>73/114.39 |
| 11,719,180 | B1 * | 8/2023 | Miyahara | G07C 5/0816<br>701/103 |
| 12,339,197 | B2 * | 6/2025 | Nishimura | G01M 3/3263 |
| 2013/0297178 | A1 * | 11/2013 | Hill | F02D 41/00<br>701/102 |
| 2023/0160360 | A1 * | 5/2023 | Miyahara | F02M 25/0809<br>701/102 |

* cited by examiner

LEAK DIAGNOSIS APPARATUS

CROSS-REFERENCE TO RELATED APPLICATION

This application is based upon and claims the benefit of priority of the prior Japanese Patent Application No. 2023-043445, filed on Mar. 17, 2023, the entire contents of which are incorporated herein by reference.

TECHNICAL FIELD

The present disclosure relates to a leak diagnosis apparatus.

BACKGROUND

There is a leak diagnosis apparatus for performing leak diagnosis of a fuel tank mounted on a vehicle based on a pressure in the fuel tank. Specifically, in a case where a temperature of an engine greatly changes, if the pressure in the fuel tank greatly changes correspondingly, it is diagnosed that the leak is absent. In the case where the temperature of the engine greatly changes, if the pressure slightly changes, it is diagnosed that the leak is present (see, for example, Japanese Unexamined Patent Application Publication No. 2013-137035).

For example, in a case where the engine and the fuel tank mounted on the vehicle are away from each other, the influence of the change in the temperature of the engine on the pressure in the fuel tank is small. In such a case in the above-described method, it is determined that the temperature of the engine greatly changes but the pressure slightly changes, so that it might be erroneously diagnosed that the leak is present, although the leak is absent in reality. In this way, the accuracy of the leak diagnosis might decrease.

SUMMARY

It is therefore an object of the present disclosure to provide a leak diagnosis apparatus with improved accuracy in leak diagnosis of a fuel tank mounted on a vehicle.

The above object is achieved by a leak diagnosis apparatus for performing leak diagnosis of a fuel tank mounted on a vehicle, including: a calculation unit configured to calculate an amount of change in a pressure in the fuel tank and an amount of change in a temperature of a fuel in the fuel tank while an ignition is turned off; and a determination unit configured to determine whether a leak in the fuel tank is absent or present, wherein the determination unit is configured to determine that the leak in the fuel tank is absent, when the amount of change in the pressure is larger than a pressure determination value, and the determination unit is configured to determine that the leak in the fuel tank is present, when the amount of change in the pressure is equal to or smaller than the pressure determination value and when the amount of change in the temperature is larger than a temperature determination value.

The calculation unit may be configured to calculate a difference between a maximum value of the pressure and a minimum value of the pressure while the ignition is turned off as the change amount of the pressure, and to calculate a difference between a maximum value of the temperature and a minimum value of the temperature while the ignition is turned off as the amount of change in the temperature, and the temperature determination value may be set based on a difference between a temperature of a saturated vapor of the fuel corresponding to the maximum value of the pressure and a temperature of the saturated vapor of the fuel corresponding to the minimum value of the pressure.

When the amount of change in the pressure is equal to or smaller than the pressure determination value and when the amount of change in the temperature is equal to or smaller than the temperature determination value, the determination unit may be configured not to determine whether the leak in the fuel tank is absent or present, and the calculation unit may be configured to continue to calculate the amount of change in the pressure and the amount of change in the temperature.

The leak diagnosis apparatus may include an acquisition unit configured to acquire the pressure and the temperature.

The leak diagnosis apparatus may include an acquisition unit configured to acquire the pressure and an outside air temperature, wherein the calculation unit may be configured to estimate a plurality of change patterns of the temperature based on a change in the outside air temperature, to specify a change pattern in which a difference between a maximum value of the temperature and a minimum value of the temperature is smallest among the plurality of change patterns, and to calculate a difference between the maximum value of the temperature and the minimum value of the temperature in the specified change pattern as the amount of change in the temperature.

DETAILED DESCRIPTION

[Schematic Configuration of Vehicle]

Figure 1:
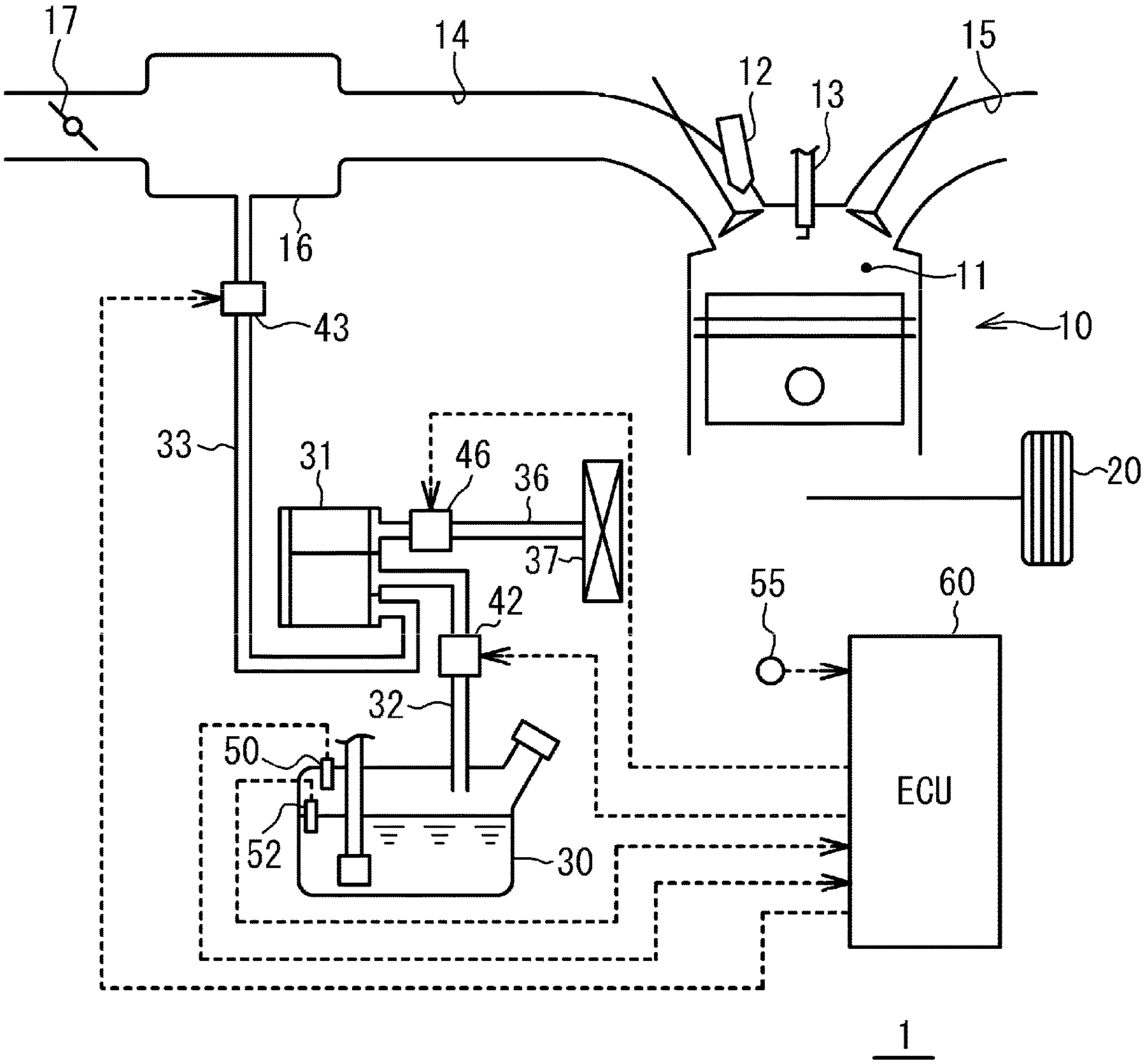
FIG. 1 is a schematic configuration view of a vehicle.

FIG. 1 is a schematic configuration view of a vehicle 1. In the present embodiment, the vehicle 1 is mounted on a vehicle. The vehicle 1 includes an engine 10, a fuel tank 30, and an electronic control unit (ECU) 60. The fuel tank 30 stores fuel for the engine 10. The fuel in the fuel tank 30 is supplied to a fuel injection valve 12 through a fuel supply path. A pressure sensor 50 detects a pressure in the fuel tank 30. The fuel temperature sensor 52 detects a temperature of the fuel in the fuel tank 30.

The driving force of the engine 10 is transmitted to drive wheels 20. The engine 10 is provided with the fuel injection valve 12 for injecting and supplying fuel into a combustion chamber 11, an ignition plug 13 for igniting an air-fuel mixture which is a mixture of the injected fuel and intake air, and the like. An intake passage 14 and an exhaust passage 15 are connected to the combustion chamber 11. A surge fuel tank 16 is provided in the intake passage 14. A throttle valve 17 is provided upstream of the surge fuel tank 16.

A canister 31 for adsorbing fuel vapor generated in the fuel tank 30 is provided. The canister 31 and the fuel tank 30 communicate with each other through a vapor passage 32.

The vapor passage 32 is provided with a closing valve 42 for opening and closing the vapor passage 32. When the closing valve 42 is opened, the fuel vapor in the fuel tank 30 is temporarily captured by an adsorbent of the canister 31.

The canister 31 and the surge fuel tank 16 communicate with each other through a purge passage 33. The purge passage 33 is provided with a purge valve 43 for opening and closing the purge passage 33. An outside air introduction passage 36 for introducing outside air into the canister 31 is connected to the canister 31. An air filter 37 is provided at an open end of the outside air introduction passage 36.

The outside air introduction passage 36 is provided with a switching valve 46 for opening and closing the outside air introduction passage 36. During operation of the engine 10, the switching valve 46 opens the outside air introduction passage 36.

When the predetermined condition is satisfied, the purge valve 43 is opened in a state where the switching valve 46 is opened and the closing valve 42 is closed during the operation of the engine 10. Thus, the fuel vapor is desorbed from the canister 31. The desorbed fuel vapor is introduced into the surge fuel tank 16 through the purge passage 33 and burned in the combustion chamber 11.

The ECU 60 is an electronic control unit including an arithmetic processing circuit that performs various kinds of arithmetic processing related to the travel control of the vehicle 1 and a memory that stores a control program and date. Various sensors for detecting an operating state of the engine 10, a fuel temperature sensor 52, an ignition switch 55, and the like are connected to the ECU 60. The ECU 60 executes various controls of the vehicle 1 and the engine 10 based on signals from the sensors and the switches. The ECU 60 will be described in detail later, but is an example of a leak diagnostic device. The ECU 60 functionally achieves a calculation unit, a determination unit, and an acquisition unit.

[Leak Diagnosis Control]

Figure 2:
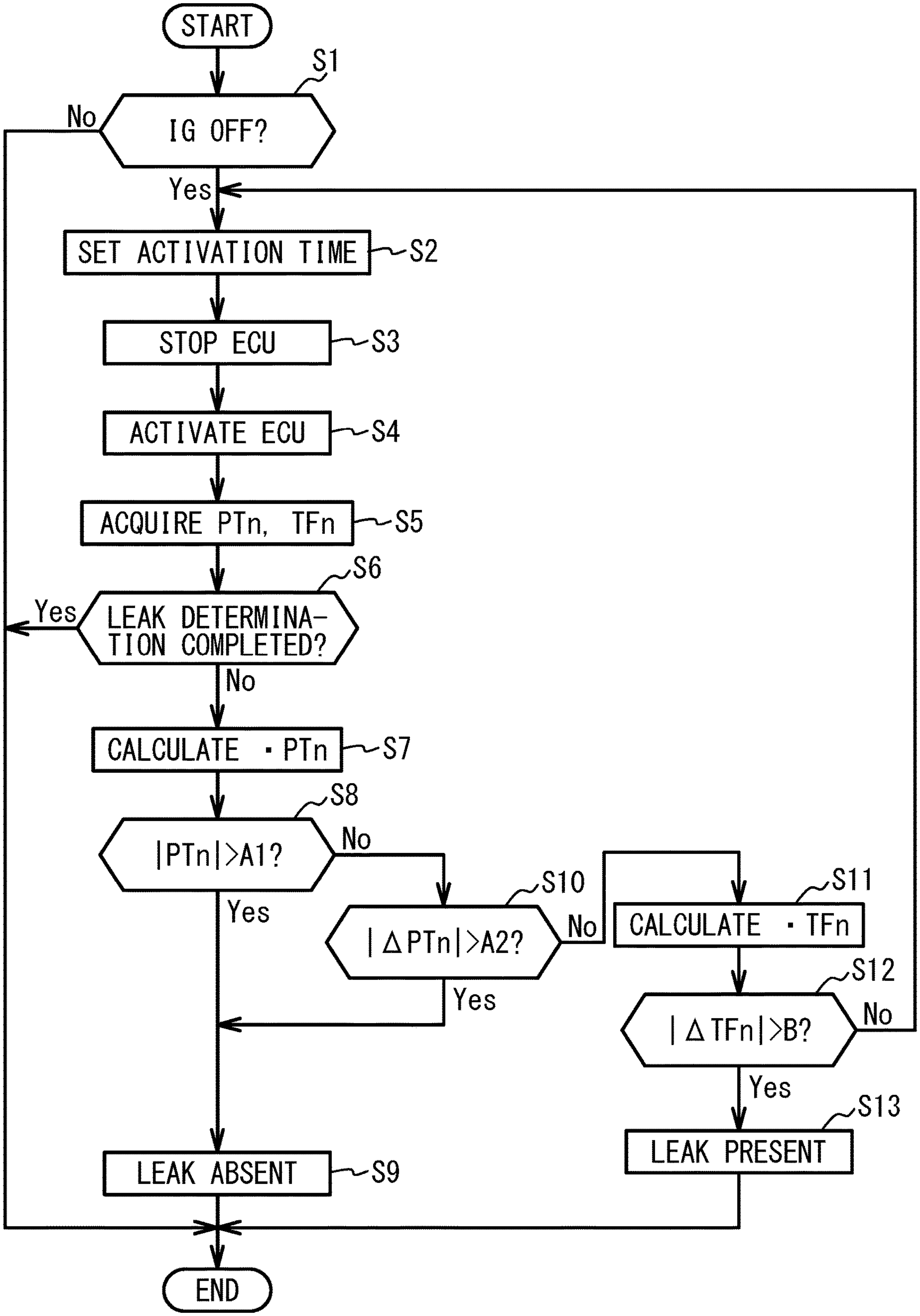
FIG. 2 is a flowchart illustrating leakage diagnosis control.

FIG. 2 is a flowchart illustrating leakage diagnosis control. The ECU 60 determines whether or not the turning-off of the ignition is detected (step S1). In the case of No in step S1, this control ends. In the case of Yes in step S1, the ECU 60 sets next activation time of the ECU 60 (step S2) and stops (step S3). The activation time of the ECU 60 is, for example, the time at which a predetermined time elapses from immediately before the ECU 60 stops. The predetermined time is, for example, one hour. When the current time reaches the activation time, the ECU 60 is automatically activated (step S4).

Next, the ECU 60 acquires a pressure PTn in the fuel tank 30 and a temperature TFn of the fuel in the fuel tank 30 based on a detection value of the pressure sensor 50 and a detection value of the fuel temperature sensor 52 (step S5). As will be described in detail later, the ECU 60 is repeatedly activated and stopped while the ignition is turned off, and the ECU 60 acquires pressures and temperatures each time when the ECU 60 is activated. Therefore, a subscript n indicates the number of times the ECU 60 is activated while the ignition is turned off. For example, the pressure and the temperature acquired at the time of the first activation while the ignition is turned off are expressed as a pressure PT1 and a temperature TF1, respectively. The pressure and the temperature acquired at the time of the second activation while the ignition is turned off are expressed as a pressure PT2 and a temperature TF2, respectively. Thus, the ECU 60 acquires the pressures and temperatures at predetermined time intervals. The pressure PTn is a gauge pressure based on the atmospheric pressure. Step S5 is an example of a process executed by the acquisition unit.

Next, the ECU 60 determines whether or not the leak determination is completed (step S6). In the case of Yes in step S6, this control ends.

In the case of No in step S6, the ECU 60 calculates a pressure change amount ΔPTn (step S7). The pressure change amount ΔPTn is a difference between the maximum and minimum values among the pressures PT1, PT2, . . . . PTn acquired by the ECU 60. That is, the pressure change amount ΔPTn is the maximum value among the pressure change amounts that are calculated based on the acquired pressures. Step S7 is an example of a process executed by the calculation unit.

Next, the ECU 60 determines whether or not an absolute value of the pressure PTn is higher than a pressure determination value A1 (step S8). Here, the pressure sensor 50 has a predetermined tolerance. The atmospheric pressure varies depending on the weather. Therefore, the pressure determination value A1 is set to a gauge pressure which is considered to be substantially the atmospheric pressure in consideration of the tolerance of the pressure sensor 50 and the amount of fluctuation in the atmospheric pressure. Therefore, in the case of Yes in step S8, the pressure in the fuel tank 30 is considered to be far from the atmospheric pressure. In this case, the ECU 60 determines that the leak in the fuel tank 30 is absent (step S9).

In the case of No in step S8, the ECU 60 determines whether or not an absolute value of the pressure change amount ΔPTn is greater than a pressure determination value A2 (step S10). Therefore, in the case of Yes in step S10, the amount of change in the pressure in the fuel tank 30 is considered to be larger than the amount of change in the atmospheric pressure. In this case, the ECU 60 determines that the leak in the fuel tank 30 is absent (step S9). Step S10 is an example of a process executed by the determination unit.

In the case of No in step S10, the ECU 60 calculates a temperature change amount ΔTFn (step S11). The temperature variation ΔTFn is a difference between the maximum and minimum values among temperatures TF1, TF2, . . . . TFn acquired by the ECU 60. That is, the temperature change amount ΔTFn is the maximum value among the amounts of change in the temperature that are calculated based on the acquired temperatures. Step S11 is an example of a process executed by the calculation unit.

Figure 3:
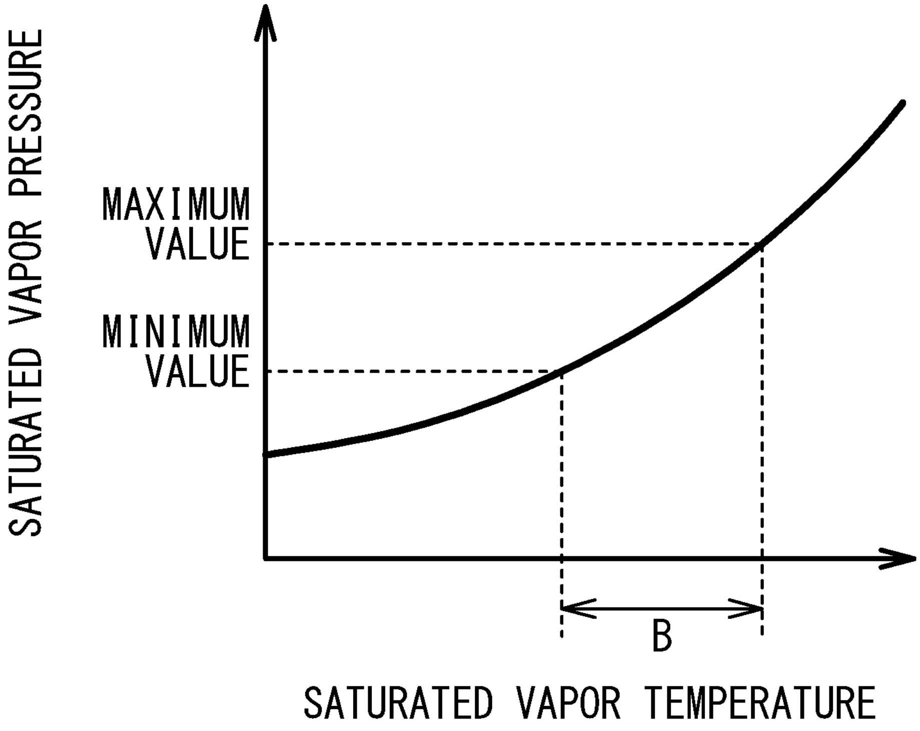
FIG. 3 is a map defining a saturated vapor pressure curve of fuel.

Next, the ECU 60 determines whether or not the absolute value of the temperature change amount ΔTFn is greater than a temperature determination value B (step S12). The temperature determination value B is determined based on a saturated vapor pressure of the fuel. FIG. 3 is a map defining a saturated vapor pressure curve of the fuel. The ECU 60 sets the temperature determination value B with reference to the map of FIG. 3. Specifically, when the maximum value among the pressures PT1, PT2, . . . PTn is set as the saturated vapor pressure of the fuel, the ECU 60 calculates a saturated vapor temperature corresponding to this saturated vapor pressure with reference to the map of FIG. 3. Next, when the minimum value among the pressures PT1, PT2, . . . . PTn is set as the saturated vapor pressure of the fuel, the ECU 60 calculates a saturated vapor temperature corresponding to this saturated vapor pressure with reference to the map of FIG. 3. The ECU 60 sets a difference between the two saturated vapor temperatures as the temperature determination value B.

In the case of No in step S10 and Yes in step S12, it is assumed that the amount of change in the fuel temperature is large due to, for example, the influence of the outside air temperature, but the amount of change in the pressure in the fuel tank 30 is small. In this case, the ECU 60 determines that the leak in the fuel tank 30 is present (step S13). In this way, the leak diagnosis is performed based on the amount of change in the pressure in the fuel tank 30 and the amount of change in the temperature of the fuel in the fuel tank 30. Therefore, the leakage diagnosis is performed more accurately than, for example, in a case where the leakage diagnosis is performed based on a temperature of the engine 10. Step S12 is an example of a process executed by the determination unit.

In the case of No in step S12, the ECU 60 does not determine whether the leak is absent or present, and executes the processes from step S2 again. As a result, the ECU 60 newly acquires the pressure PTn and the temperature TFn (step S5), and continues the calculation of the pressure change amount ΔPTn (step S7) and the calculation of the temperature change amount ΔTFn (step S11). In this way, in the case of No in step S12, the processes from step S2 are repeated. That is, the ECU 60 is automatically activated at regular time intervals to continue the calculation of the pressure change amount ΔPTn and the temperature change amount ΔTFn. Thus, the leak diagnosis is performed with high accuracy.

Figure 4:
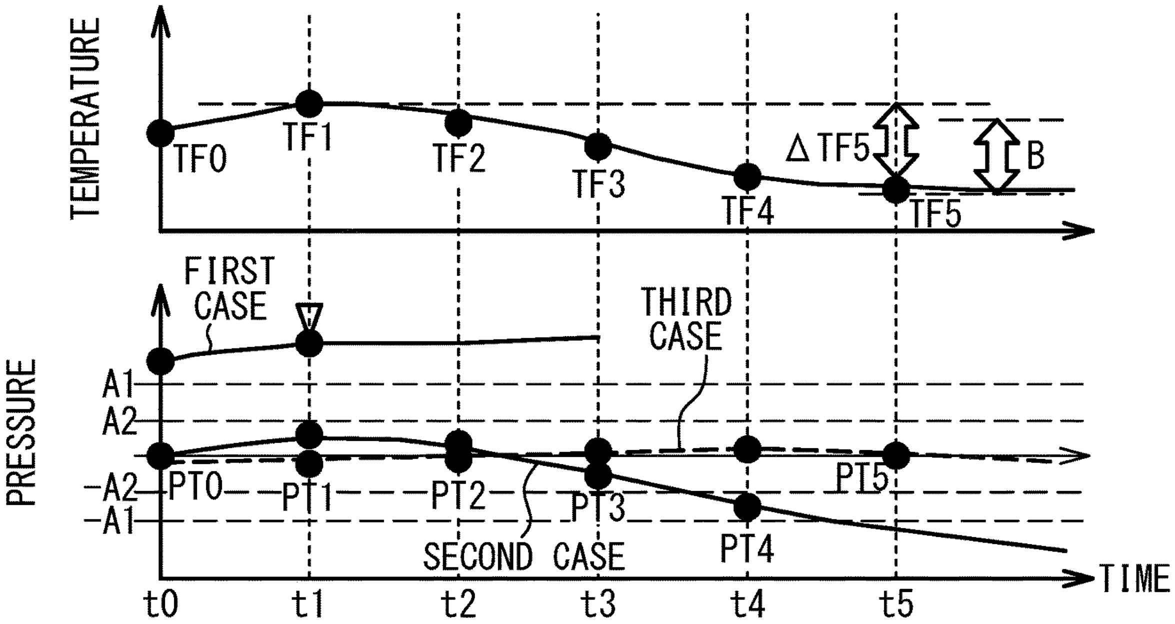
FIG. 4 is a timing chart illustrating the leakage diagnosis control.

FIG. 4 is a timing chart illustrating the leakage diagnosis control. FIG. 4 illustrates changes in the temperature of the fuel in the fuel tank 30 and the pressure in the fuel tank 30. FIG. 4 illustrates a first case, a second case, and a third case.

The first case will be described. At time to, the ignition is turned off. At time t1, the ECU 60 acquires the pressure PT1 and the temperature TF1 (step S5). The pressure PT1 is higher than the pressure determination value A1 (Yes in step S8). Therefore, it is determined that the leak is absent (step S9).

The second case will be described. The pressure PT1 at time t1 is smaller than the pressure determination value A1 (No in step S8). Further, the pressure change amount ΔPT1 is also calculated as zero. Therefore, the pressure change amount ΔPT1 is smaller than the pressure determination value A2 (No in step S10). Further, the temperature change amount ΔTF1 is also calculated as zero. Therefore, the temperature change amount ΔTF1 is smaller than the temperature determination value B (No in step S12).

The pressure PT2 at time t2 is smaller than the pressure determination value A1 (No in step S8). The pressure change amount ΔPT2 is a difference between the pressure PT1 and the pressure PT2. The pressure change amount ΔPT2 is smaller than the pressure determination value A2 (No in step S10). The temperature change amount ΔTF2 is a difference between the temperature TF1 and the temperature TF2. The temperature change amount ΔTF2 is smaller than the temperature determination value B (No in step S12). Also at time t3, the above-described processes are executed.

An absolute value of the pressure PT4 at time t4 is smaller than the pressure determination value A1 (No in step S8). An absolute value of the pressure change amount ΔPT4 is greater than the pressure determination value A2 (Yes in step S10). Therefore, it is determined that the leak is absent (step S9).

The third case will be described. Each absolute value of the pressures PT1, PT2, PT3, PT4, and PT5 is smaller than the pressure determination value A1 (No in step S8). Each absolute value of the pressure change amounts ΔPT1, ΔPT2, ΔPT3, ΔPT4, and ΔPT5 is also smaller than the pressure determination value A2 (No in step S10). Each absolute value of the temperature change amounts ΔTF1, ΔTF2, ΔTF3, and ΔTF4 is also smaller than the temperature determination value B (No in step S12). However, the absolute value of the temperature change amount ΔTF5 is greater than the temperature determination value B (Yes in step S12). Therefore, it is determined that the leak is present (step S13). Since the temperature of the fuel greatly changes while the pressure does not substantially change, it is accurately determined that the leak is present.

[Variation]

Figure 5:
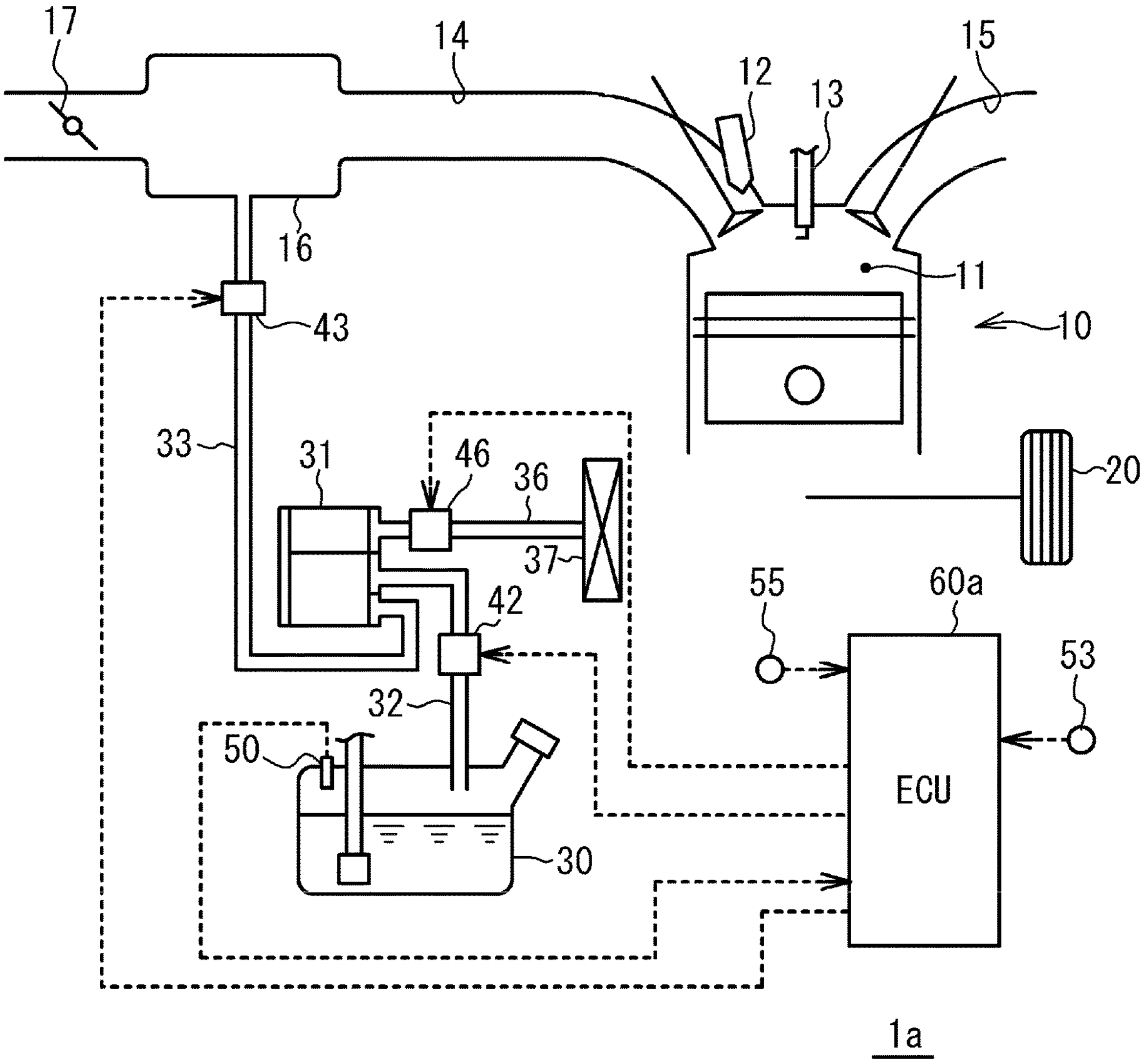
FIG. 5 is a schematic configuration view of a vehicle according to a variation.

FIG. 5 is a schematic configuration view of a vehicle 1*a* according to a variation. FIG. 5 corresponds to FIG. 1. In the variation, description of the same configuration and processes as those of the above-described embodiment will be omitted. The fuel temperature sensor 52 described above is not provided in the vehicle 1*a*. In the vehicle 1*a*, an outside air temperature sensor 53 for detecting an outside air temperature is provided.

Figure 6:
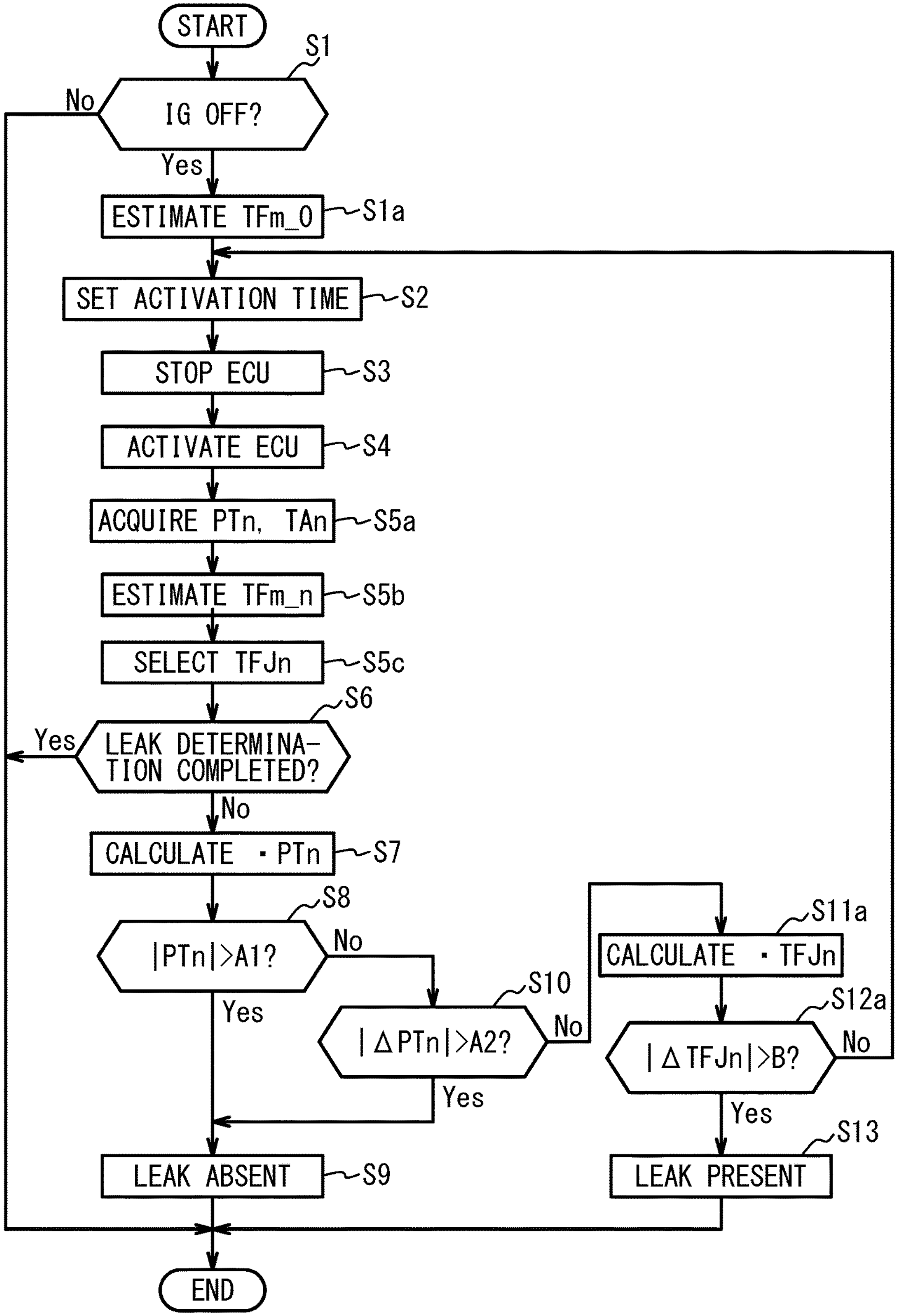
FIG. 6 is a flowchart illustrating the leakage diagnosis control according to the variation.

FIG. 6 is a flowchart illustrating leakage diagnosis control according to the variation. FIG. 6 corresponds to FIG. 2. In the case of Yes in step S1, an ECU 60*a* acquires an outside air temperature TA0 based on a detection value of the outside air temperature sensor 53, and estimates a temperature TFm_0 based on an outside air temperature TA0 (step S1*a*). The temperature TFm_0 is an initial value of a change pattern of the temperature of the fuel in the fuel tank 30, which will be described in detail later. m is an integer of 2 or more. m indicates the number of estimated change patterns of the temperature of the fuel.

After executing the process of step S4, the ECU 60*a* acquires the pressure PTn and the outside air temperature Tan based on detection values of the pressure sensor 50 and the outside air temperature sensor 53 (step S5*a*). Step S5*a* is an example of a process executed by the acquisition unit.

The ECU 60*a* estimates the temperature TFm_n based on the outside air temperature Tan (step S5*b*). The temperature TFm_n is an estimated value of the temperature of the fuel in the fuel tank 30. Specifically, the ECU 60*a* estimates m types of temperature change patterns. m is an integer of 2 or more. Temperatures TF1_0, TF1_1, . . . . TF1_*n* correspond to the first pattern. Temperatures TF2_0, TF2_1, . . . . TF2_*n* correspond to the second pattern. Temperatures TFm_0, TFm_1, . . . . TFm_n correspond to the m-th pattern. The ECU 60*a* selects one of the first to m-th patterns as a minimum pattern TFJn (step S5*c*). The minimum pattern TFJn is selected as follows. In each of the first to m-th patterns, a difference between the maximum value of the temperature and the minimum value of the temperature is calculated. A pattern having the smallest difference among the differences corresponding to the first to m-th patterns is selected as the smallest pattern TFJn. Steps S5*b* and S5*c* are examples of processes executed by the calculation unit. The details will be described later.

In the case of No in step S10, the ECU 60*a* calculates a temperature change amount ΔTFJn (step S11*a*). The temperature change amount ΔTFJn is a difference between the maximum and minimum values of the temperature in the minimum pattern TFJn. Step S11*a* is an example of a process executed by the calculation unit.

Next, the ECU 60*a* determines whether or not an absolute value of the temperature change amount ΔTFJn is greater than the temperature determination value B (step S12*a*). Step S12*a* is an example of a process executed by the determination unit.

As described above, the amount of change in the fuel temperature is estimated based on the amount of change in the outside air temperature. Therefore, it is not needed to provide a fuel temperature sensor, and the manufacturing cost is reduced.

Figure 7:
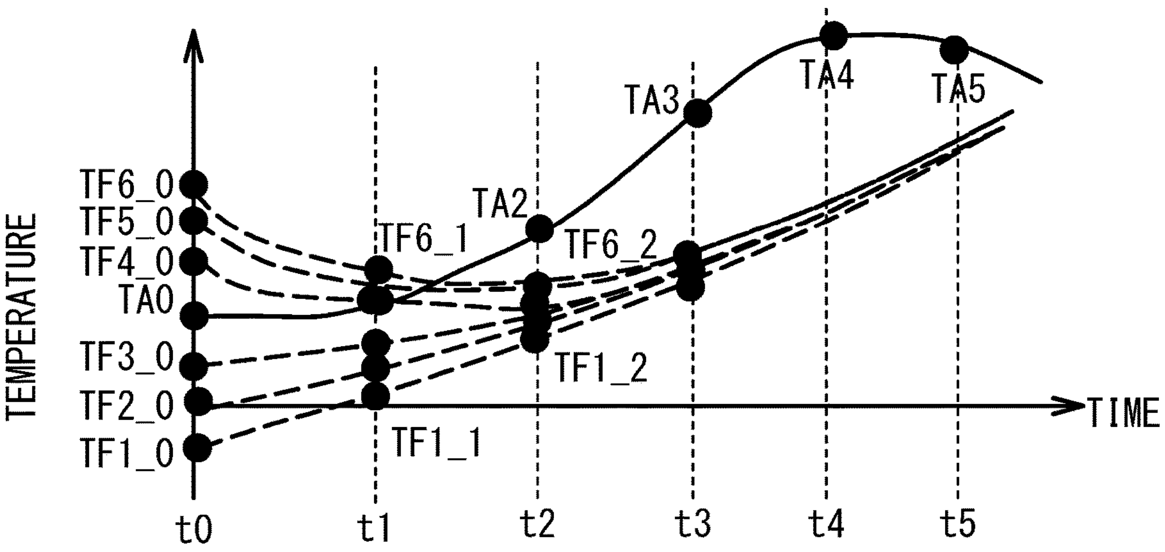
FIG. 7 is a timing chart illustrating a method of selecting a minimum pattern.

FIG. 7 is a timing chart illustrating a method of selecting the minimum pattern TFJn. FIG. 7 illustrates a case where m=6 is satisfied. The ignition is turned off at time t0, and the ECU 60*a* estimates temperatures TF1_0, TF2_0, . . . . TF6_0 based on the outside air temperature TA0 (step S1*a*). Among these temperatures, the temperature TF1_0 is the lowest temperature, and the temperature TF6_0 is the highest temperature. The temperatures TF1_0, TF2_0, and TF3_0 are lower than the outside air temperature TA0. The temperatures TF4_0, TF5_0, and TF6_0 are higher than the outside air temperature TA0. The temperatures TF1_0, TF2_0, and TF3_0 are different from one another by a predetermined temperature. The temperatures TF3_0, TF4_0, TF5_0, and TF6_0 are also different from one another by a predetermined temperature. If these temperatures differ by, for example, two degrees, the following relationship holds.

TF1_0=TA0−6

TF2_0=TA0−4

TF3_0=TA0−2

TF4_0=TA0+2

TF5_0=TA0+4

TF6_0=TA0+6

At time t1, the ECU 60*a* acquires an outside air temperature TA1 (step S5*a*). Further, the ECU 60*a* estimates temperatures TF1_1, TF2_1, . . . . TF6_1 based on the outside air temperature TA1 (step S5*b*). A method of estimating these temperatures will be described later. The ECU 60*a* selects a pattern, in which the difference between the maximum values of the temperature and the minimum values of the temperature is the smallest among the first to sixth patterns, as a minimum pattern TFJn (step S5*c*). Specifically, a difference between the temperature TF1_0 and the temperature TF1_1, a difference between the temperature TF2_0 and the temperature TF2_1, a difference between the temperature TF3_0 and the temperature TF3_1, a difference between the temperature TF4_0 and the temperature TF4_1, a difference between the temperature TF5_0 and the temperature TF5_1, and a difference between the temperature TF6_0 and the temperature TF6_1. The pattern having the minimum difference is selected as the minimum pattern TFJn.

Similarly, at time t2, the ECU 60*a* estimates temperatures TF1_2, TF2_2, . . . TF6_2 based on an outside air temperature TA2 (step S5*b*). The ECU 60*a* selects the minimum pattern TFJn among the first to sixth patterns (step S5*c*). Specifically, a difference between the maximum and minimum values of the temperatures TF1_0, TF1_1, and TF1_2 in the first pattern is calculated. Similarly, a difference between the maximum and minimum values of the temperatures TF2_0, TF2_1, and TF2_2 in the second pattern is calculated. A difference between the maximum and minimum values of the temperatures TF3_0, TF3_1, and TF3_2 in the third pattern is calculated. A difference between the maximum and minimum values of the temperatures TF4_0, TF4_1, and TF4_2 in the fourth pattern is calculated. A difference between the maximum and minimum values of the temperatures TF5_0, TF5_1, and TF5_2 in the fifth pattern is calculated. A difference between the maximum and minimum values of the temperatures TF6_0, TF6_1, and TF6_2 in the sixth pattern is calculated. The pattern having the minimum difference is selected as the minimum pattern TFJn. The same applies to time t3, time t4, and time t5.

In this way, the minimum pattern TFJn in which the change amount of the estimated temperature is the minimum is estimated as the change pattern of the fuel temperature. Therefore, the estimated temperature change amount ΔTFJn is prevented from being excessive with respect to an actual temperature change amount of the fuel. This is because if the estimated temperature change amount ΔTFJn is excessive with respect to the actual temperature change amount of the fuel, there is a risk of an erroneous determination of Yes in step S12*a*. Thus, the leakage diagnosis is performed with high accuracy.

Next, a method of estimating the temperature TFm_n of the fuel in the fuel tank 30 will be described. The temperature TFm_n excluding the temperature TFm_0 is estimated by the following equation.

$$TFm\_n=TFm\_(n-1)+Eaf+Evf \quad (1)$$

Eaf indicates an amount of change in the temperature of the fuel due to thermal energy which the fuel receives from outside air. Evf indicates the amount of change in the temperature of the fuel due to thermal energy which the fuel receives from a fuel vapor in the fuel tank 30.

$$Eaf=(TaN-TFm\_(n-1))*Jtf/(Htf/1000)*S\text{fuel}/Jf/\text{FUELVOL}*\Delta t \quad (2)$$

$$EVf=(TVm\_(n-1)-TFm\_(n-1))*Jfv/(Hfv/1000)*Sfv/Jf/\text{FUELVOL}*\Delta t \quad (3)$$

Jtf indicates a thermal conductivity between a wall portion of the fuel tank 30 and the fuel. Jfv indicates a thermal conductivity between the fuel and the fuel vapor. Htf indicates a thickness of a wall portion of the fuel tank 30 between the fuel and the outside air. Hfv indicates a thickness of an imaginary boundary surface existing between a liquid surface of the fuel and the fuel vapor. Sfuel indicates a contact area between the fuel tank 30 and the fuel. Sfv indicates a contact area between the fuel and the fuel vapor. Jf indicates a specific heat of the fuel. FUELVOL indicates a volume of the fuel tank 30. Δt indicates a time interval at which TFm_n is calculated. TVm (n−1) is a previous value of TVm_n. TVm_n is an estimated value of a temperature of the fuel vapor in the fuel tank 30. Jtf, Jfv, Jf, Htf, and Hfv are stored beforehand in the ROM of the ECU 60*a*. Sfuel, Sfv, and FUELVOL are calculated by the ECU 60*a* based on an amount of the fuel in the fuel tank 30.

TVm_n is calculated by the following equation.

$$TVm\_n=TVm\_(n-1)+Efv+Eav \quad (4)$$

Efv indicates the amount of change in the temperature of the fuel vapor due to thermal energy which the fuel vapor receives from the fuel. Eav indicates the amount of change in the temperature of the fuel vapor due to a thermal energy which the fuel vapor receives from the outside air.

$$Efv=(TFm\_n-TVm\_(n-1))*Jfv/(Hfv/1000)*Sfv/Jv/(\text{TNKVOL}-\text{FUELVOL})*\Delta t \quad (5)$$

$$Eav=(TaN-TVm\_(n-1))*Jtv/(Htv/1000)*S\text{vapor}/Jv/(\text{TNKVOL}-\text{FUELVOL})*\Delta t \quad (6)$$

Jv indicates a specific heat of the fuel vapor. Htv indicates a thickness of a wall portion of the fuel tank 30 existing between the fuel vapor and the outside air. TNKVOL indicates a volume of the fuel tank 30. Svapor indicates a contact area between a wall portion of the fuel tank 30 and the fuel vapor. Jv and Htv are stored beforehand in the ROM of the ECU 60*a*. TNKVOL and Svapor are calculated by the ECU 60*a* based on the amount of the fuel in the fuel tank 30.

As described above, the ECU 60*a* estimates the temperature TFm_n of the fuel in the fuel tank 30 based on the above-described equations.

Although some embodiments of the present disclosure have been described in detail, the present disclosure is not limited to the specific embodiments but may be varied or changed within the scope of the present disclosure as claimed.

What is claimed is:

1. A leak diagnosis apparatus for performing leak diagnosis of a fuel tank mounted on a vehicle, comprising:

an electronic control unit including an arithmetic processing circuit and a memory, the electronic control unit being configured to:

calculate an amount of change in a pressure in the fuel tank and an amount of change in a temperature of a fuel in the fuel tank while an ignition is turned off, determine whether a leak in the fuel tank is absent or present, acquire the pressure and an outside air temperature, estimate a plurality of change patterns of the temperature of the fuel in the fuel tank based on a change in the outside air temperature, specify a change pattern in which a difference between a maximum value of the temperature of the fuel in the fuel tank and a minimum value of the temperature of the fuel in the fuel tank is smallest among the plurality of change patterns, and calculate a difference between the maximum value of the temperature of the fuel in the fuel tank and the minimum value of the temperature of the fuel in the fuel tank in the specified change pattern as the amount of change in the temperature of the fuel in the fuel tank, wherein the electronic control unit is configured to determine that the leak in the fuel tank is absent, when the amount of change in the pressure in the fuel tank is larger than a pressure determination value, and the electronic control unit is configured to determine that the leak in the fuel tank is present, when the amount of change in the pressure in the fuel tank is equal to or smaller than the pressure determination value and when the amount of change in the temperature of the fuel in the fuel tank is larger than a temperature determination value.

2. The leak diagnosis apparatus according to claim 1, wherein the electronic control unit is configured to calculate a difference between a maximum value of the pressure and a minimum value of the pressure while the ignition is turned off as the change amount of the pressure, and to calculate a difference between a maximum value of the temperature and a minimum value of the temperature while the ignition is turned off as the amount of change in the temperature, and the temperature determination value is set based on a difference between a temperature of a saturated vapor of the fuel corresponding to the maximum value of the pressure and a temperature of the saturated vapor of the fuel corresponding to the minimum value of the pressure.

3. The leak diagnosis apparatus according to claim 1, wherein when the amount of change in the pressure is equal to or smaller than the pressure determination value and when the amount of change in the temperature is equal to or smaller than the temperature determination value, the electronic control unit is configured not to determine whether the leak in the fuel tank is absent or present, and the electronic control unit is configured to continue to calculate the amount of change in the pressure and the amount of change in the temperature.

* * * * *